United States Patent [19]

Komoda et al.

[11] Patent Number: 5,398,332
[45] Date of Patent: Mar. 14, 1995

[54] SYSTEM FOR DETECTING THE MALFUNCTION OF A CPU INCLUDING A WATCHDOG TIMER CIRCUIT AND A MEMORY FOR STORING A MALFUNCTION COUNT

[75] Inventors: Motoyoshi Komoda, Tokyo; Masahiro Ishigami, Saitama, both of Japan

[73] Assignee: NEC Corporation, Tokyo, Japan

[21] Appl. No.: 914,454

[22] Filed: Jul. 17, 1992

[30] Foreign Application Priority Data

Jul. 19, 1991 [JP] Japan .................. 3-203264

[51] Int. Cl.⁶ .................. G06F 11/00; G06F 11/32
[52] U.S. Cl. .................. 395/575; 371/68.1; 371/61; 371/62
[58] Field of Search .................. 371/16.3, 15.1, 16.4, 371/17, 18, 16.5, 29.1, 61, 62, 21.6; 395/575

[56] References Cited

U.S. PATENT DOCUMENTS

| | | | |
|---|---|---|---|
| 3,566,368 | 2/1971 | DeBlauw | 340/172.5 |
| 4,395,755 | 7/1983 | Wakai | 371/29.1 |
| 4,535,455 | 8/1985 | Peterson | 371/21.6 |
| 4,627,060 | 12/1986 | Huang et al. | 371/16.3 |
| 4,683,568 | 7/1987 | Urban | 371/16.3 |
| 4,809,280 | 2/1989 | Shonaka | 371/16.3 |
| 4,956,807 | 9/1990 | Hosaka et al. | 371/62 |
| 5,073,853 | 12/1991 | Johnson | 395/575 |
| 5,233,613 | 8/1993 | Allen et al. | 395/575 |

FOREIGN PATENT DOCUMENTS

| | | |
|---|---|---|
| 3207120 | 9/1983 | Germany . |
| 58-119060 | 7/1983 | Japan .................. 371/16.3 |

OTHER PUBLICATIONS

Patent Abstracts of Japan, vol. 10, No. 86, P-443 (2143), 4 Apr. 1986.
Patent Abstracts of Japan, vol. 7, No. 96, P-193 (1241), 22 Apr. 1983.
Patent Abstracts of Japan, vol. 010, No. 179, (E-414), 10 Feb. 1986.
IBM Technical Disclosure Bulletin, vol. 24, No. 7B, Dec. 1981, Quinlan, W. P., Clock Monitor Reset Circuit.

*Primary Examiner*—Hoa T. Nguyen
*Attorney, Agent, or Firm*—Foley & Lardner

[57] ABSTRACT

A system for detecting the malfunction of a CPU (Central Processing Unit) is disclosed. A watchdog timer applies an interrupt signal to the CPU on detecting the malfunction of the CPU. In response to the interrupt signal, the CPU executes interrupt processing to increment the number of times that the CPU has malfunctioned stored in a nonvolatile memory. As the number of times stored in the nonvolatile memory reaches a predetermined value, the CPU displays an alarm message on a display.

1 Claim, 3 Drawing Sheets

SYSTEM FOR DETECTING THE MALFUNCTION OF A CPU INCLUDING A WATCHDOG TIMER CIRCUIT AND A MEMORY FOR STORING A MALFUNCTION COUNT

BACKGROUND OF THE INVENTION

The present invention relates to a system for detecting the malfunction of a CPU (Central Processing Unit) and, more particularly, to a system which allows a person to see the number of times that a CPU has malfunctioned.

The prerequisite witch an apparatus needing high reliability is that the malfunction of the apparatus be detected to allow processing matching the result of detection to be executed. An automobile telephone, for example, has to be highly reliable since it uses public electromagnetic waves. It is a common practice with an automobile telephone to provide a CPU with a diagnosing function. When circuitry governed by the CPU malfunctions, the CPU with the diagnosing function interrupts the ordinary operation and thereby inhibits the telephone from being used until the cause of malfunction has been removed by, for example, repair at a maintenance division. For example, when a malfunction occurs in a transmitting circuit, the CPU displays a message such as "TRANSMITTER ERROR" on a display and stops accepting commands other than a power off command. Further, the malfunction of the CPU itself is apt to impair public transactions by unusual electromagnetic waves. In the light of this, the automobile telephone is also provided with a mechanism for preventing the CPU from malfunctioning. This kind of mechanism is usually referred to as a fault tolerance mechanism.

The automobile telephone deals with the malfunction of the CPU by incorporating a watchdog timer therein. After the watchdog timer has been reset by the CPU, it interrupts the CPU on detecting the elapse of a predetermined period of time on the basis of a clock which is independent of a clock applied to the CPU. Specifically, the CPU resets the watchdog timer at a period shorter than the above-mentioned period of time, so that it may be interrupted as soon as it malfunctions. When the CPU malfunctions and is interrupted by the watchdog timer, it stops the processing under way and, instead, executes predetermined interrupt processing. The malfunction of the CPU is partly ascribable to noise or a similar cause which rarely occurs and partly ascribable to a CPU fault or a similar cause which occurs relatively frequently. It is, therefore, difficult to find the cause of the malfunction of the CPU. This, coupled with the fact that the probability of error reproduction is extremely low, causes the interrupt processing to simply reset the hardware of the automobile telephone.

Simply resetting the hardware as stated above is undesirable since the user of the automobile telephone cannot recognize the malfunction of the CPU and, therefore, cannot see if the CPU is in a stable state. Moreover, regarding CPU errors of the kind not occurring more than a predetermined frequency, their causes cannot be easily found even at a maintenance division. Hence, when the product is brought to a maintenance division to remove the cause of a different kind of CPU error, it is often returned to the user without the cause relating to the malfunction of the CPU being removed.

SUMMARY OF THE INVENTION

It is therefore an object of the present invention to provide a system which allows the user to see if the CPU is in a stable state with ease and allows the maintenance division to see the presence of a potential cause of malfunction.

In accordance with the present invention, a system for detecting the malfunction of a CPU comprises a watchdog timer for interrupting the CPU, and a nonvolatile memory for recording the cumulative number of times that the CPU has malfunctioned. The CPU increments the cumulative number of times stored in the nonvolatile memory every time the CPU is interrupted by the watchdog timer.

Also, in accordance with the present invention, a method of detecting the malfunction of a CPU comprises the steps of recording the cumulative number of times that the CPU has malfunctioned, interrupting the CPU on detecting a malfunction of the CPU, and incrementing the cumulative number of times recorded.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
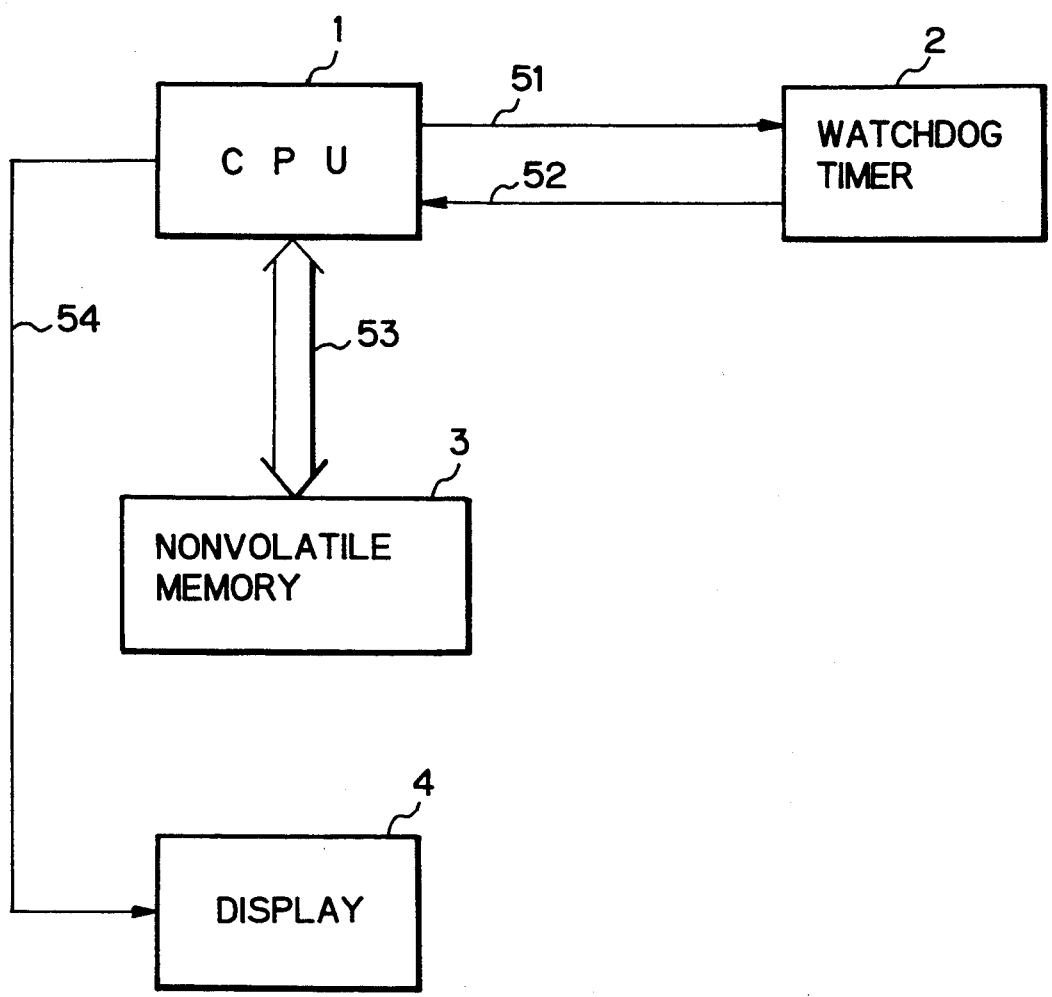
FIG. 1 is a block diagram schematically showing a CPU malfunction detection system embodying the present invention.

Referring to FIG. 1 of the drawings, a CPU malfunction detection system embodying the present invention is shown and made up of a CPU 1, a watchdog timer 2, a nonvolatile memory 3, and a display 4. The CPU 1 executes predetermined software processing while sending a watchdog timer reset signal 51 to the watchdog timer 2. Assuming that the CPU 1 is incorporated in an automobile telephone, for example, it executes software processing particular to an automobile telephone system. On receiving an interrupt signal 52 from the watchdog timer 2, the CPU 1 starts on predetermined interrupt processing. The watchdog timer 2 is operated by a clock independent of a clock applied to the CPU 1. When the watchdog timer reset signal 51 is not sent from the CPU 1 to the watchdog timer 2, the latter sends the interrupt signal 52 to the former at predetermined time intervals. On receiving the interrupt signal 52 on, for example, a hardware reset terminal, the CPU 1 resets a program counter to address #0, resumes the processing, and initializes peripheral circuitry. While executing normal processing, the CPU 1 sends the watchdog timer reset signal 51 to the watchdog timer 2 at shorter time intervals than the interrupt signals 52. As a result, the CPU 1 resets the watchdog timer 2 before the latter sends the interrupt signal 51 to the former.

Figure 2:
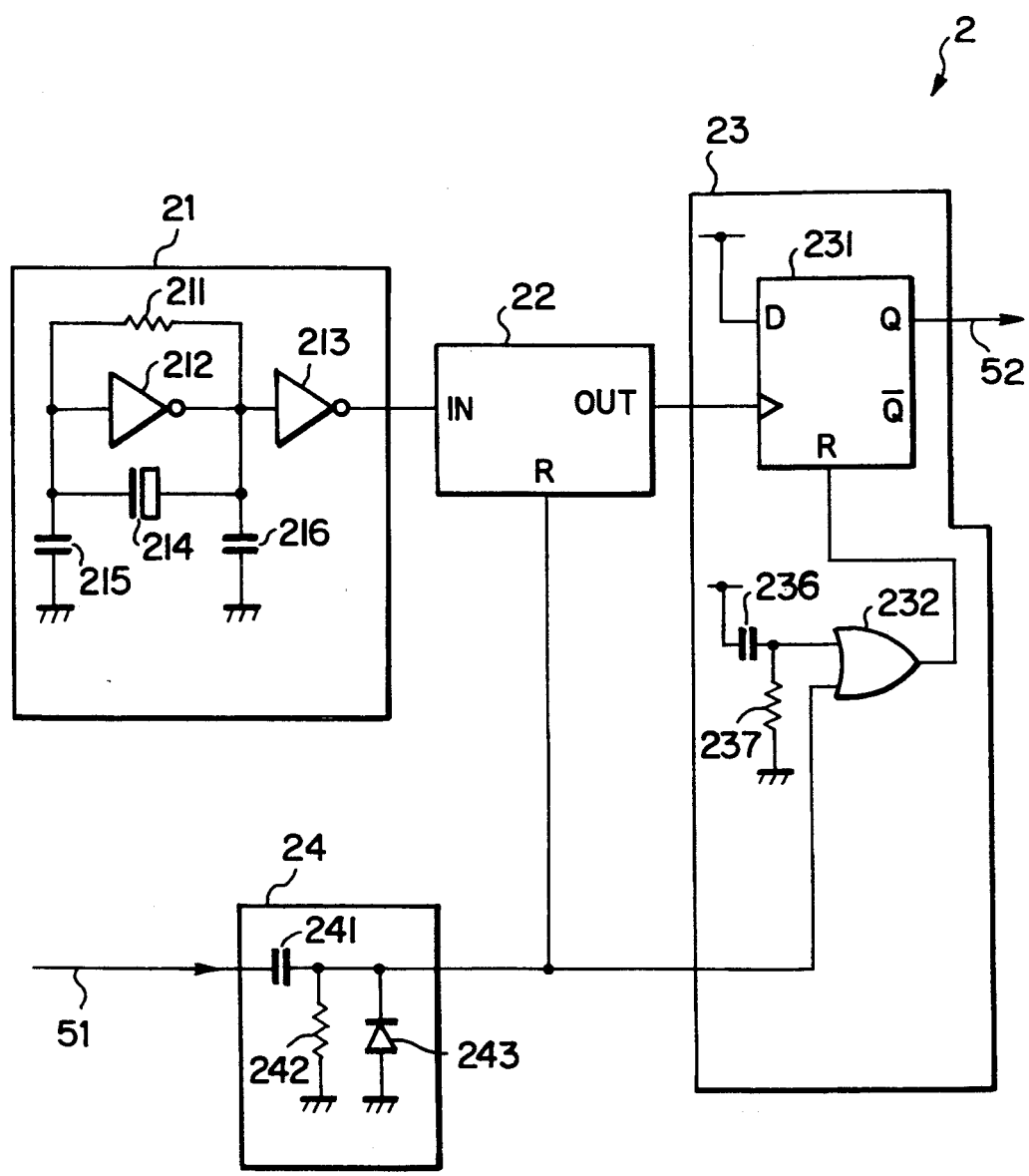
FIG. 2 is a block diagram schematically showing a specific construction of a watchdog timer.

FIG. 2 shows a specific construction of the watchdog timer 2. As shown, the watchdog timer 2 has an oscillation circuit 21, a shift register 22, a D-type flip-flop circuit 23, and a differentiating circuit 24. The oscillation circuit 21 generates a clock whose frequency is determined by a crystal 214. An inverter 212 is an inverting amplifier for the oscillation of the crystal 214 while an inverter 213 is a buffer for feeding the clock to the shift register 22. A resistor 211 and capacitors 215 and 216 constitute a load circuit for determining the oscillation gain in frequency.

The shift register 22 lowers the frequency of the clock fed from the oscillation circuit 21 and delivers the resulting clock to the D-type flip-flop circuit 23 This is to match the period the watchdog timer reset signal 51 generated by the CPU 1 and the operational period of the flip-flop circuit 23.

The differentiating circuit 24 has a capacitor 241, a resistor 242 and a diode 243. At a positive-going edge of the watchdog timer reset signal 51, the circuit 24 generates a positive pulse and feeds it to the D-type flip-flop circuit 23. The diode 24 protects the circuit from a negative pulse appearing at the negative-going edge of the reset signal 51. An OR gate 232 included in the D-type flip-flop circuit 23 provides a reset when the power source is turned on. A capacitor 236 and a resistor 237 constitute a differentiating circuit. As this differentiating circuit feeds a positive pulse to the OR gate 232 on the turn-on of the power source, the OR gate 232 delivers a positive pulse of the same duration or width to the flip-flop circuit 231 so as to prevent the interrupt signal 52 from being generated. The time interval of the watchdog timer 2 is determined by the oscillation circuit 21 and shift register 22. Specifically, the fixed oscillation frequency of the oscillation circuit 21 is divided by the shift register 22 to produce any desired time interval. On the turn-on of a power source, the flip- flop circuit 23 is reset by an integrating circuit implemented as a capacitor 236 and resistor 237 circuit, producing a negative level on a Q output thereof. However, on the elapse of a predetermined time interval, the flip-flop circuit 23 is set by a clock fed from the shift register 22 to thereby produce the interrupt signal 52 of positive level on the Q output. The differentiating circuit 24 differentiates the watchdog timer reset signal 51 from the CPU 1 and feeds the differentiated signal 51 to the shift register 22 and flip-flop circuit 23 to reset them. It follows that the interrupt signal 52 does not appear so long as the CPU 1 is normal and outputs the watchdog timer reset signal 51 at shorter time intervals than the interrupt signal 52.

The CPU 1 delivers to the nonvolatile memory 3 data 53 representative of the number of times that the CPU 1 has malfunctioned. The nonvolatile memory 3 stores the cumulative value of such frequencies. Further, the CPU 1 feeds a display signal 54 to the display 4 in order to display an alarm message or similar message.

Figure 3:
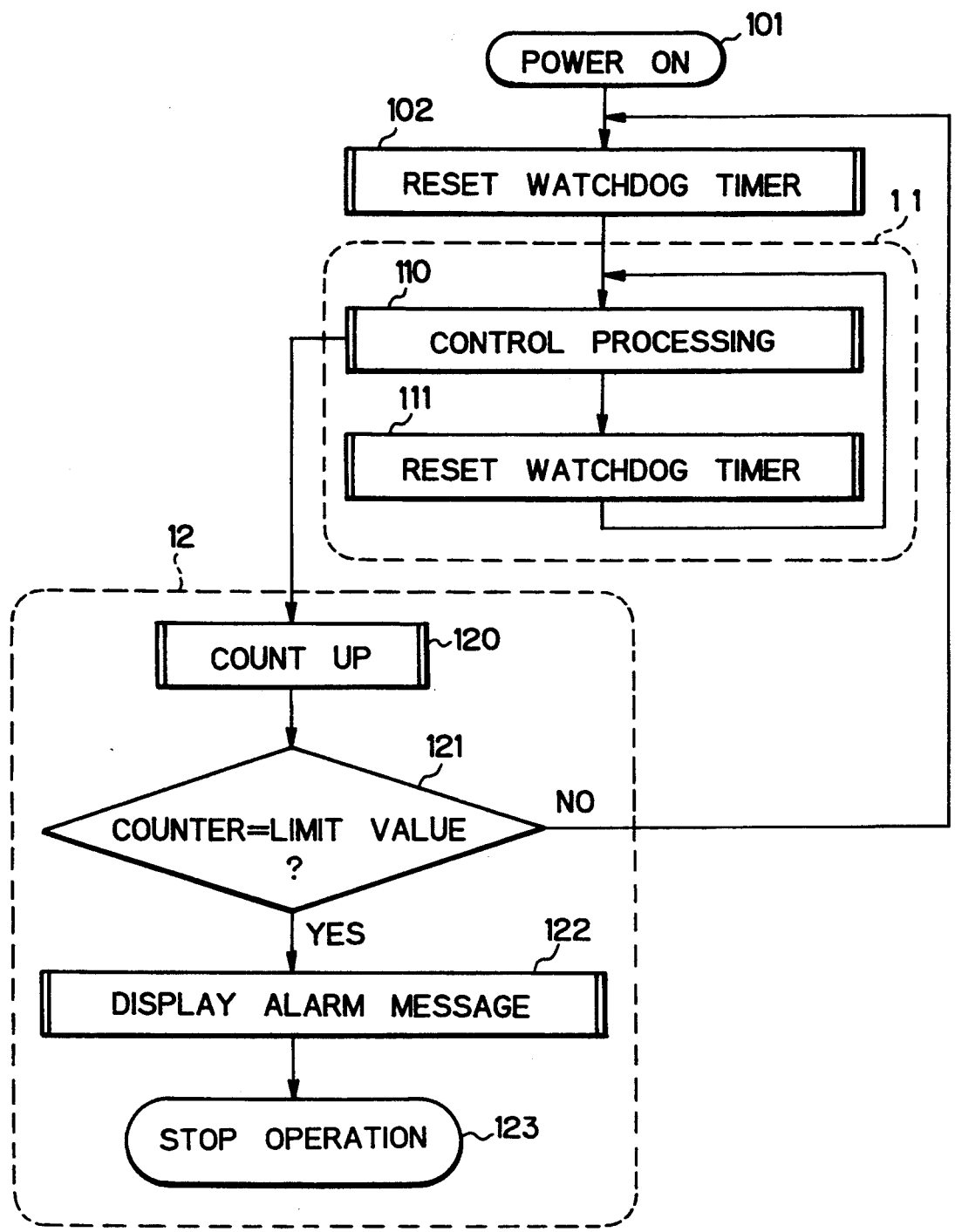
FIG. 3 is a flowchart demonstrating a specific operation of a CPU.

Referring to FIG. 3, a specific operation of the CPU 1 representative of the operation of the embodiment will be described. On the turn-on of the power source (step 102), the CPU 1 resets the watchdog timer 2 (step 102) to thereby bring the time interval to the start. Subsequently, the CPU 1 executes a main routine 11. Specifically, in the main routine 11, the CPU 1 executes predetermined control processing (step 110) particular to an automobile telephone and including processing matching key inputs, processing of received data and data to be transmitted, and conversation processing, and watchdog timer reset processing (step 111) for sending the watchdog timer reset signal 51 to the watchdog timer 2.

While the CPU 1 is normal and sends the watchdog timer reset signal 51 to the watchdog timer 2 at shorter intervals than the interrupt signal 52, the interrupt signal 52 does not appear and, therefore, the CPU 11 continues the main routine 11. Assume that the CPU 1 has malfunctioned due to some cause and failed to send the watchdog timer reset signal 51 to the watchdog timer 2. Then, the watchdog timer 2 sends the interrupt signal 52 to the CPU 1. On receiving the interrupt signal 52, the CPU 1 is caused to set up an address assigned to an interrupt routine 12 on a program counter. Then, the CPU 1 starts on the interrupt routine 12.

The interrupt routine 12 begins with a step 120 for incrementing a variable stored in the nonvolatile memory 3. Here, let the initial value of the variable be zero. The nonvolatile memory 3 may be implemented by one which is usually incorporated in an automobile telephone for storing a mobile unit number and other numbers (ESN). The CPU 1 compares the incremented variable in the memory 3 with a predetermined limit value (step 21). If the variable is smaller than the limit value (NO, step 121), the CPU 1 returns to the processing which immediately follows the turn-on of the power source. Specifically, assuming that the limit value is N, the CPU 21 returns to such processing if the incremented variable is $N-1$ or less. If the incremented variable is equal to the limit value (YES, step 121), the CPU 1 produces an alarm message on the display 4 informing the user of the need for repair (step 122) and then stops the operation (step 123). For the display 4, use may be made of a display unit usually provided on an automobile telephone for informing the user of a telephone number and various operating states.

In summary, it will be seen that the present invention provides a CPU malfunction detection system which stores the cumulative number of malfunctions of a CPU in a nonvolatile memory and displays an alarm message when it exceeds a predetermined value. The system, therefore, allows the user to readily see that the CPU is not stably operating and to hand it over to a maintenance division.

Even when a product incorporating the CPU is brought to a maintenance division due to a cause other than the malfunction of the CPU, whether or not a potential cause of CPU malfunction of the kind needing repair is present can be easily determined on the basis of the cumulative value stored in the nonvolatile memory.

Further, by totaling the numbers of malfunctions stored in the nonvolatile memories of one type of product and comparing the resulting data with data of another type of product, the maintenance division can see if products of one type are more stable than product of another type. This is feeds back useful information to a development division.

Various modifications will become possible for those skilled in the art after receiving the teachings of the present disclosure without departing from the scope thereof.

What is claimed is:

1. A system for detecting a malfunction of a processing system, comprising:
   a CPU (Central Processing Unit) normally providing a watchdog timer reset signal at a predetermined interval;
   a watchdog timer, normally receiving said watchdog timer reset signal, for providing an interrupt signal to said CPU when said reset signal is not received from said CPU at said predetermined interval;

a nonvolatile memory, connected to said CPU, for storing a numerical value, said numerical value representative of a number of times that said CPU has malfunctioned, said numerical value being recorded in said nonvolatile memory and read from said nonvolatile memory by said CPU, said CPU reading out said numerical value from said nonvolatile memory, incrementing said numerical value, and storing said incremented numerical value in said nonvolatile memory every time said CPU receives said interrupt signal provided by said watchdog timer;

compare means in said CPU for comparing said numerical value to a predetermined number;

display means for displaying a symbol designated by said CPU as an alarm message, said CPU causing said display means to display said alarm message when said numerical value reaches said predetermined value;

wherein said watchdog timer comprises:

an oscillation circuit having a fixed oscillation frequency;

a shift register for dividing the fixed oscillation frequency received from said oscillation circuit to determine a timer interval of said watchdog timer and outputting a shift register signal indicative thereof;

a flip-flop circuit receiving said shift register signal for generating said interrupt signal for interrupting said CPU; and a differentiating circuit for differentiating said watchdog timer reset signal from the CPU and delivering the differentiated watchdog timer reset signal to said shift register and said flip-flop circuit for thereby resetting said shift register and said flip-flop circuit.

* * * * *